United States Patent [19]
Focke

[11] Patent Number: 5,232,332
[45] Date of Patent: Aug. 3, 1993

[54] CONVEYING DEVICE FOR THE REMOVAL OF OBJECTS FROM A BASE

[75] Inventor: Heinz Focke, Verden, Fed. Rep. of Germany

[73] Assignee: Focke & Co., (GmbH & Co.), Verden, Fed. Rep. of Germany

[21] Appl. No.: 831,639

[22] Filed: Feb. 10, 1992

Related U.S. Application Data

[63] Continuation of Ser. No. 516,995, Apr. 30, 1990, abandoned.

[30] Foreign Application Priority Data

May 3, 1989 [DE] Fed. Rep. of Germany ....... 3914596

[51] Int. Cl.$^5$ ............................................. B65G 59/04
[52] U.S. Cl. .................................. 414/797; 414/744.5; 414/744.8; 414/796.9; 901/40
[58] Field of Search .................. 414/627, 744.5, 744.8, 414/796.6, 797, 737, 793, 738, 742, 731, 732; 294/2; 901/40

[56] References Cited

U.S. PATENT DOCUMENTS

| | | | |
|---|---|---|---|
| 3,206,041 | 9/1965 | McGrath | 414/929 |
| 3,401,811 | 9/1968 | Gräsvoll | 414/796.6 |
| 3,820,667 | 6/1974 | Critchlow et al. | 414/627 |
| 4,435,118 | 3/1984 | Behrend et al. | 414/744.5 |
| 4,453,874 | 6/1984 | Veldhuizen et al. | 198/518 X |
| 4,585,389 | 4/1986 | Watanabe et al. | 414/737 X |

FOREIGN PATENT DOCUMENTS

| | | | |
|---|---|---|---|
| 1261073 | 2/1963 | Fed. Rep. of Germany . | |
| 1197903 | 8/1965 | Fed. Rep. of Germany . | |
| 1286964 | 1/1969 | Fed. Rep. of Germany . | |
| 1756787 | 8/1970 | Fed. Rep. of Germany . | |
| 2160765 | 6/1973 | Fed. Rep. of Germany . | |
| 2306691 | 8/1974 | Fed. Rep. of Germany | 414/797 |
| 2631942 | 2/1977 | Fed. Rep. of Germany . | |
| 2828860 | 1/1979 | Fed. Rep. of Germany . | |
| 8132417 | 9/1985 | Fed. Rep. of Germany . | |
| 3718601 | 12/1988 | Fed. Rep. of Germany . | |
| 62-4132 | 1/1987 | Japan | 414/627 |
| 1-48724 | 2/1989 | Japan | 414/796.6 |
| 1456399 | 11/1976 | United Kingdom . | |
| 1559973 | 1/1980 | United Kingdom . | |
| 2125363 | 3/1984 | United Kingdom . | |

OTHER PUBLICATIONS

Copies Submitted with applicant's Submission Under 37 C.F.R. 1.56 filed Jul. 20, 1990.

*Primary Examiner*—Michael S. Huppert
*Assistant Examiner*—Janice Krizek
*Attorney, Agent, or Firm*—Sughrue, Mion, Zinn, Macpeak & Seas

[57] ABSTRACT

The invention relates to a process and a conveying device for the removal of objects, in particular square objects, preferably cardboard boxes, from a base, in particular of objects from a pack formed from identical objects. There are provided a process and a conveying device, by which the objects can be removed from the base even if the objects cannot be gripped from the top and are relatively unstable, such as for example open cardboard boxes, and the base is secure against slipping by increased friction resistance. Each object to be removed is tilted at one bottom edge opposite to its free side and is then removed. The corresponding conveying device is distinguished by a tilting organ which can be applied to the free side of the object to be removed, the region of which tilting organ which can be applied to the object can be moved by a vertical component, and by a removal apparatus for the removal of the tilted object from the base, in which case the removal apparatus can preferably be the tilting organ itself.

13 Claims, 5 Drawing Sheets

CONVEYING DEVICE FOR THE REMOVAL OF OBJECTS FROM A BASE

This is a continuation of application Ser. No. 07/516,995, filed Apr. 30, 1990, now abandoned.

BACKGROUND OF THE INVENTION

The invention relates to a process for the removal of objects, in particular square objects, preferably cardboard boxes, from a base, in particular of objects from a pack formed from identical objects.

Furthermore, the invention relates to a conveying device, preferably a depalletizing device, for the removal of objects from a base, in particular for carrying out the abovementioned process, for which independent protection is also being claimed.

Objects, in particular square objects, such as for example cardboard boxes, are frequently stacked on top of each other to form several packs, for example on a pallet. In order to prevent the packs from slipping towards one another in the case of the palletized stack, inserts are frequently placed additionally between the packs, which inserts, so called anti-slip inserts, are secure against slipping mostly because of their high adhesion or friction coefficient.

Inserts are used in particular when the objects to be stacked are cardboard boxes which are without lids, that is to say are open at the top, in which case the inserts can replace the missing lids of the cardboard boxes.

Problems arise when the objects are to be removed again from bases of this kind by machines. Objects placed on bases are often removed from the base by the fact that they are gripped and lifted from the top. However, this cannot be effected in the case of objects which cannot be gripped from the top, such as for example cardboard boxes without lids which are so unstable that they cannot even be gripped securely at the top edge.

Pushing the objects down from the base is difficult or impossible in particular when the base is secure against slipping specifically in order to prevent the objects from slipping.

SUMMARY OF THE INVENTION

The underlying goal of the invention is therefore to develop a process, by means of which objects, in particular objects which cannot be gripped from the top, can be removed from bases, even if these bases, for example due to a high friction resistance, are secure against slipping.

This goal is achieved according to the invention by a process which is distinguished by the fact that each object to be removed is tilted at one bottom edge opposite to its free side and is then removed.

Objects which cannot be gripped from the top and may in addition be relatively unstable, such as for example open cardboard boxes, can also be advantageously removed from anti-slip bases using the process according to the invention. This is possible because, using the process according to the invention, the objects are firstly tilted at one bottom edge so that they can either be gripped from the bottom or at least have a lesser bottom adhesion and a lesser bottom friction for the case of sliding.

When they are tilted, the objects are contacted at only one of their free sides, of which even the outer objects of a pack of objects have at least one. Even open cardboard boxes for example can be contacted from the side, and their relative instability is not significant when they are tilted.

The tilting of the objects can be achieved in various manners; for example the object can be lifted at the side, but it can also be tilted, for example, by an exertion of pressure acting above the level of its centre of gravity.

The removal of the tilted object can also take place in various manners, for example by gripping at the bottom or sliding.

Using the process according to the invention, the object is preferably lifted as a whole at some point in time after tilting. Through the tilting, the object is partially lifted and it can then either be lifted from the base as a whole or be finally lifted as a whole after an intermediate movement, for example in order to be transferred onto a conveying apparatus, for example a conveyor belt.

Prior to being lifted, the object is firstly preferably held at the bottom because even relatively unstable objects, such as open cardboard boxes, can be lifted securely by holding at the bottom.

Using the process according to the invention, the object is preferably firstly drawn off partially from the base after tilting before it is then possibly lifted or not lifted.

A further development of the process provides for a tilting organ for tilting the object to be applied, preferably by suction, to the free side of the object. Since at least each outer object of a pack also has a free side which is accessible, this type of application of a tilting organ is always possible so that a pack can be dismantled by gradual removal of the respective outer objects.

As already mentioned, tilting of the object can be achieved by a horizontal exertion of pressure above its centre of gravity or by a vertical lateral lifting of the object; however, using the process according to the invention, the tilting organ is preferably swivelled as a whole on an arc about the bottom tilting edge of the object so that the object to be removed is turned for tilting about its bottom edge, if possible without other movement components. By this means, the removal procedure can be carried out particularly carefully.

Using the process according to the invention, individual objects in particular can be removed from the base but it can also be provided for a plurality of objects, preferably two objects arranged adjacently, to be removed at the same time.

The conveying device according to the invention is distinguished by a tilting organ which can be applied to the free side of the object to be removed, the region of which tilting organ which can be applied to the object can be moved by a vertical component, and by a removal apparatus for the removal of the tilted object from the base.

Using the conveying device according to the invention, the tilting organ is applied to the free side of an object to be removed and the object is tilted so that it can then be removed in a simple manner by the removal apparatus even if the object is placed on an anti-slip base and is, itself, of relatively unstable construction.

The tilting organ can preferably be swivelled on an arc about the bottom tilting edge of the object, which tilting edge is opposite to the free side of the object, so that the object is actually only tilted firstly before the object is moved in any other manner.

The swivellability of the tilting organ is preferably achieved in the case of the device according to the invention by an arc-shaped swivel guide for the tilting organ and a drive, preferably a double-action working cylinder, for the movement of the tilting organ along the swivel guide. In this case, the tilting organ is preferably constructed as a tilting arm which is mounted in the swivel guide which comprises guide curves extending on both sides of the arm. The guide curves can be, for example, guide slots or recesses in which pins engage for example or in which running rollers run.

Another further development of the conveying device according to the invention provides for the tilting organ to have at least one sucker in its region which can be applied to the object, which sucker can possibly be constructed as a simple suction cup, for example made of a flexible material, for example plastic, but which is preferably connected to a pump via an air pipe so that the suction effect of the sucker, which can then be constructed of rigid material, can be switched on or off as required.

The conveying device according to the invention can have a plurality of tilting organs for a plurality of objects, preferably two tilting organs arranged adjacently so that a plurality of objects can be removed at the same time in the same manner.

A preferred embodiment of the conveying device according to the invention provides for the tilting organ itself to be constructed as a removal apparatus, that is to say a separate removal apparatus is generally not required. In this case, the tilting organ can be moved back and forth, preferably by means of a double-action working cylinder, in horizontal direction, preferably transversely to the tilting edge of the object.

Thus using the tilting organ, the object to be removed is not only tilted, but it is subsequently also pulled or pushed down from the base completely or partially, to be precise in principle in any direction, in which case the object can possibly also be turned, but preferably transversely to the tilting edge. This is also possible in the case of anti-slip bases since the tilted object only has a low adhesion and friction resistance on the base because it is no longer flat but is in contact with the base only on the tilting edge.

The next further development of the invention provides for a support surface to be present to support the object(s) to be removed. In this case, the support surface is preferably positioned or is able to be positioned sufficiently far below the tilting organ that it is situated approximately on a level with the base of the object. The tilting organ can then preferably be constructed to pull the object onto the support surface. However, the support surface can also be part of a separate removal apparatus and can be displaceable back and forth under the tilted object, preferably by means of a double-action working cylinder.

The support surface can preferably be moved up and down as part of a lifting organ. This is advantageous for the further transport of the removed object, irrespective of whether the support surface is a component of a separate removal apparatus such that the tilted object held at the bottom by the support surface can be lifted from the base, or whether the tilting organ is the removal apparatus and pulls the object onto the support surface.

The support surface can be constructed in the shape of a fork.

Another further development of the invention provides for the tilting organ and the support surface to belong to a work head of the conveying device which can be moved uniformly and can preferably be assembled, preferably as part of a robot. By this means, the conveying device can be used very flexibly and can be reequipped in a simple manner with the work head according to the invention. In particular, due to the movement of the head, the removed object can be transferred in any manner and even to positions which cannot easily be reached. For example, the removed object can be brought onto, turned, slid and set down at a different level; all this is achieved only by the movement of the compact work head.

In this connection, reference should be made to the fact that, by the reversal of the functions, the removal apparatus is also an advantageous setting-down device which likewise allows a careful and secure setting-down of objects, even in packs, just as it guarantees careful and secure removal.

For the mobility of the conveying device, the work head can preferably be swivelled about a vertical head axle. A preferred embodiment of the device provides for the head to be arranged at the free end of a conveying arm which, including the head axle, is constructed in an articulated manner by preferably three vertical axles so that, using the work head even in restricted spatial conditions, objects can be removed from one position and set down in another position which can be virtually random if it is only within the working area of the conveying arm.

An exemplary embodiment from which further inventive features result is illustrated in the drawing, in which:

DESCRIPTION OF PREFERRED EMBODIMENT

Figure 1:
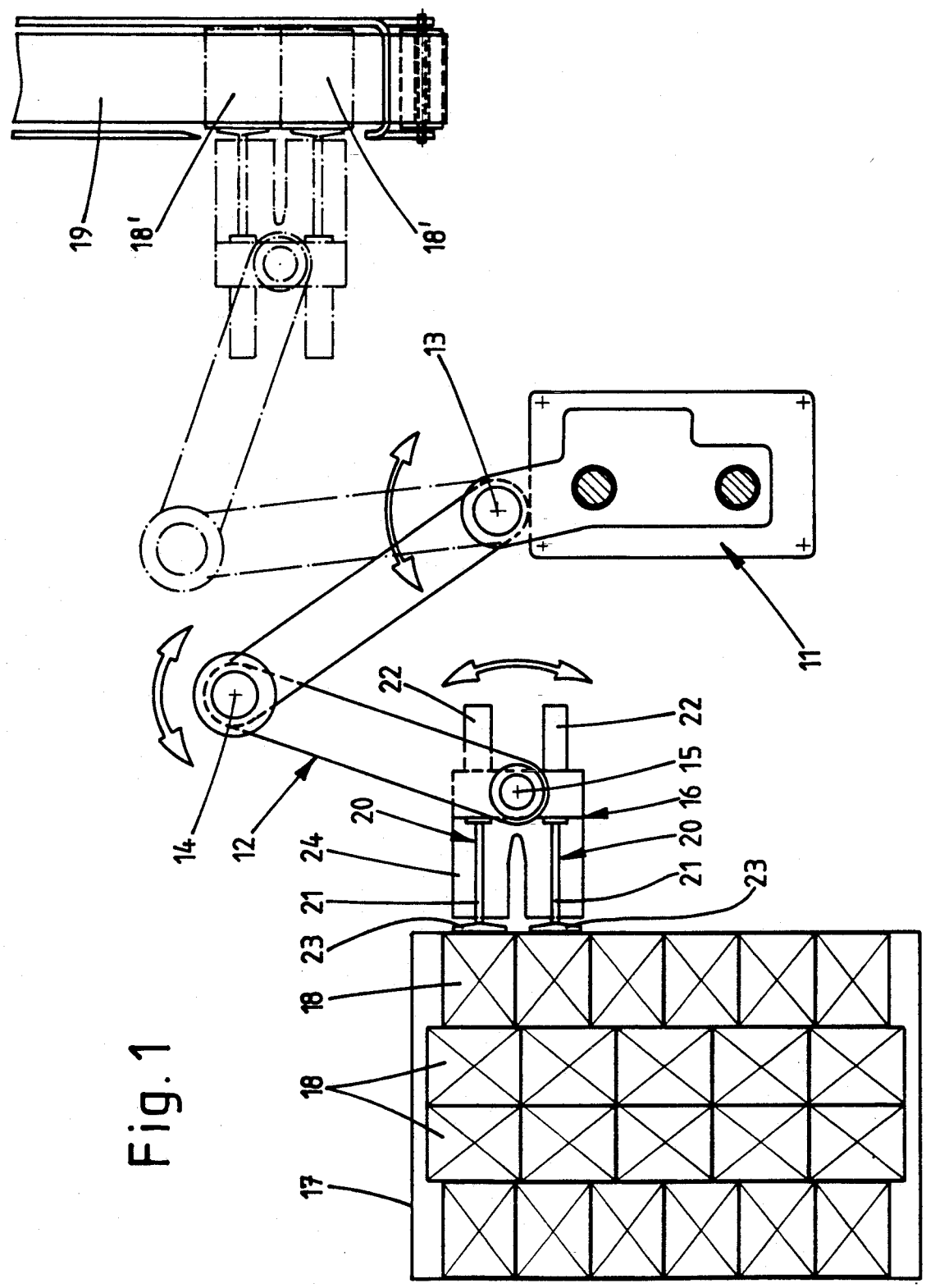
FIG. 1 shows a plan view of a conveying device according to the invention.

FIG. 1 shows a plan view of a conveying device according to the invention in the form of a robot 11.

The conveying device has a conveying arm 12 which is constructed in an articulated manner by three vertical axles 13 to 15 such that it can carry out the movements indicated with double arrows and with dot-dashed lines. Of the axles of the conveying arm 12, the head axle 15 is the vertical swivel axis of a work head 16, by means of which individual objects can be removed from a pallet 17. In the case of the objects on the pallet, these are square cardboard boxes 18 which can also be open at the top and which are stacked on top of each other in packs. Situated in this stack between the individual packs are inserts with increased friction resistance, so-called anti-slip inserts.

By means of the work head 16, the cardboard boxes 18 are removed in each case in pairs from the pallet 17 and set down in the positions 18' on a conveyor belt 19. Due to the advantageous articulation of the conveying arm 12, this transfer can even take place in restricted space.

The work head 16 comprises two tilting organs constructed as tilting arms 20, of which each one is provided for the removal of a cardboard box 18. The tilting arms have piston rods 21, which can move in and out, of double-action working cylinders 22. Arranged at the free ends of the piston rods 21 of the tilting arms 20 are suckers 23 which can be applied and fixed by suction to the free sides of the cardboard boxes 28 to be removed. Below the tilting arms 20, the work head 16 has a support surface constructed as a fork 24, onto which the cardboard boxes 18 to be removed can be pulled by retraction of the piston rods 21 of the tilting arms 20.

In the following figures, the same construction elements are denoted with the same reference numerals as in FIG. 1.

Figure 2:
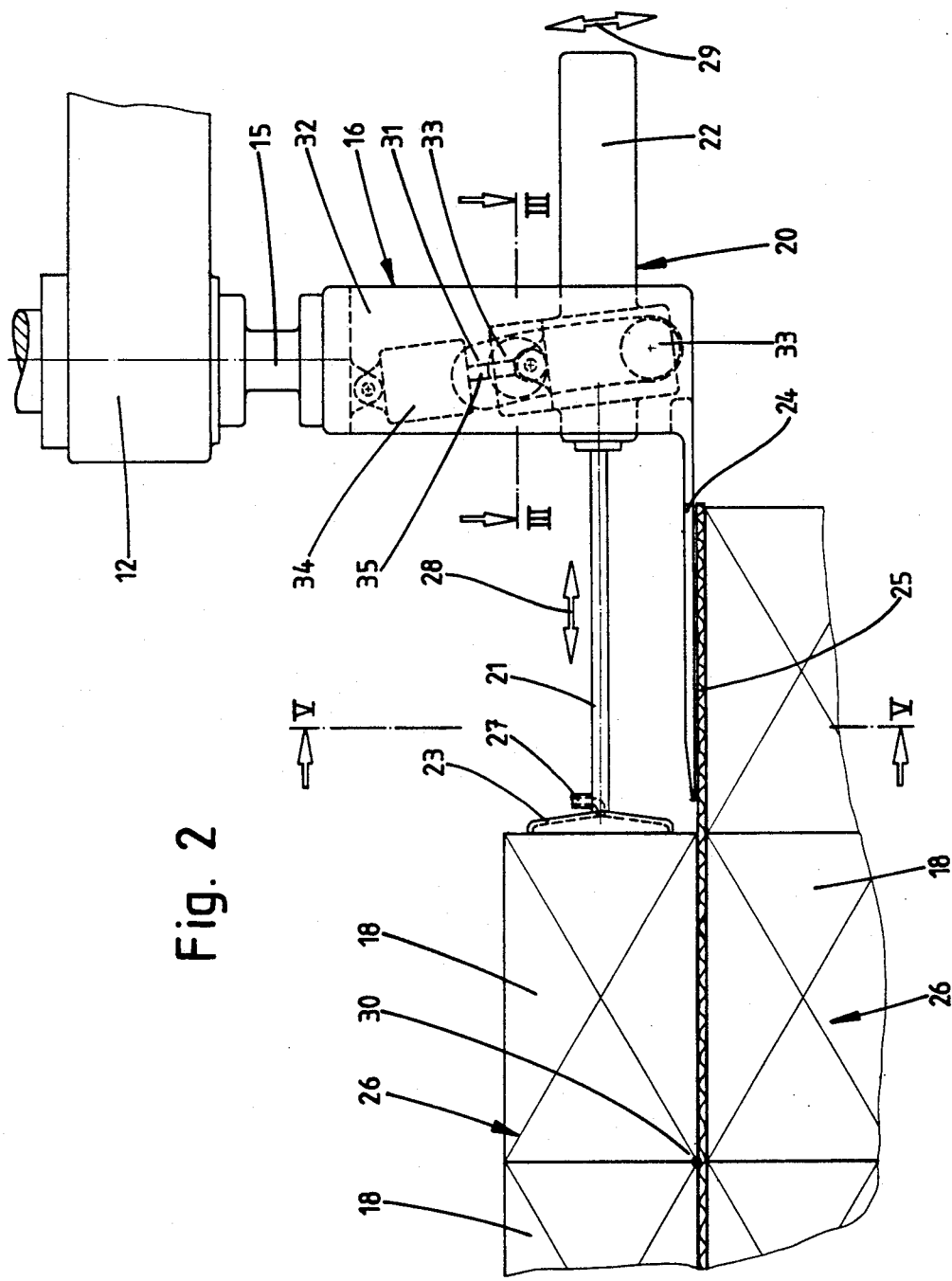
FIG. 2 shows a partial region of the conveying device according to FIG. 1 in a lateral view.

FIG. 2 shows the region of the work head 16 of the conveying device in a lateral view.

In FIG. 2, an anti-slip insert 25 can be recognized between two packs 26 of cardboard boxes 18. This anti-slip insert 25 is corrugated cardboard which is provided at its surfaces on both sides with anti-slip coatings in order to prevent the cardboard boxes from slipping.

The sucker 23 of the work head 16 is constructed as a suction cup and has a connection 27 for an air pipe. The piston rod 21, on which the sucker 23 is arranged, can be moved in and out in the directions indicated by the double arrow 28. The entire tilting arm 20 can be swivelled in the direction of the double arrow 29 about the bottom edge 30 which is opposite to the side of the cardboard box 18 to which the sucker 23 is applied. For this swivelling, the tilting arm 20 is guided in arc-shaped guide curves. The guide curves 31 are recesses in a basic frame 32 of the work head 16. Running rollers 33 of the tilting arm 20 run in the guide curves 31. For the movement of the tilting arm 20 along the guide curves 31, a double-action working cylinder 34 is accommodated in the basic frame 32, in which case it is attached with one end to the basic frame 32 and, with the free end of its piston rod 35 acts in an articulated manner on the tilting arm 20.

The guide curves 31 are designed giving due regard to the length of the extended piston rod 21 and the depth of the cardboard boxes 18 to be removed in such a way that they extend in a radius about the bottom edge 30 of the cardboard box 18 to be removed.

Figure 3:
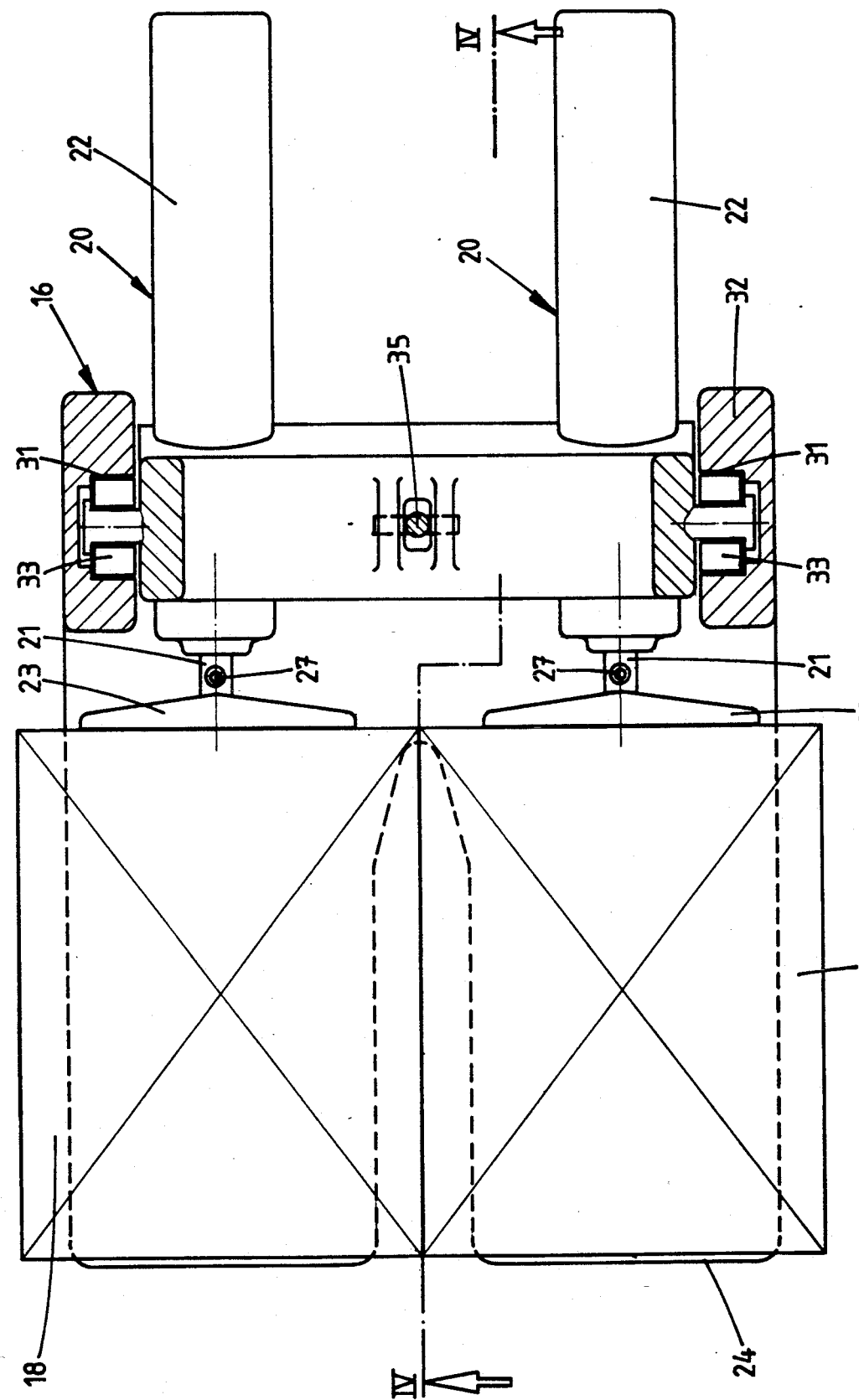
FIG. 3 shows a section through the conveying device along the dot-dashed line denoted in FIG. 2 as III—III in a plan view.

In FIG. 3, a section is illustrated through the work head 16 along the dot-dashed line denoted as III—III.

The construction of the fork 24 can be seen in particular in FIG. 3 and also the construction of the guide curves 31 and of the running rollers 33 in the basic frame 32. It can also be seen in the figure how the two parallel tilting arms 20 are interconnected inside the basic frame 32. In particular, only one working cylinder 34 is provided for the movement of the two tilting arms 20 along the guide curves 31.

Figure 4:
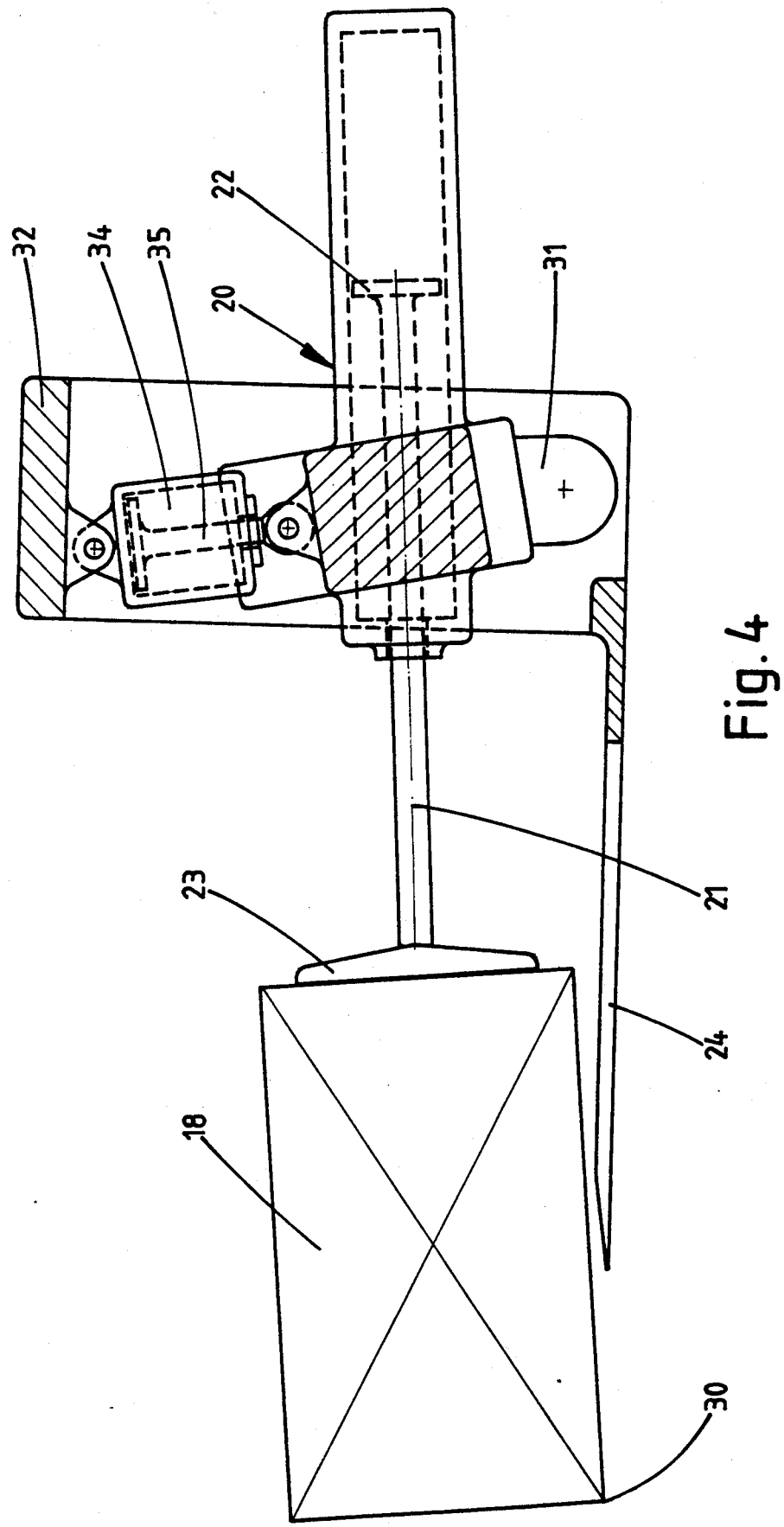
FIG. 4 shows a section through the region of the conveying device according to FIG. 3 along the dot-dashed line denoted in FIG. 3 as IV—IV and FIG. 5 shows a section through the region of the conveying device according to FIGS. 2 to 4 along the dot-dashed line denoted in FIG. 2 as V—V.

FIG. 4 shows a section through the region of the work head 16 illustrated in FIG. 3 along the dot-dashed line denoted in FIG. 3 as IV—IV.

In this figure, the basic inside construction of the working cylinders 22 and 34 can be recognized and, in this case, the working cylinder 34 is completely retracted so that the cardboard box 18 to be removed is tilted about its bottom edge 30 and the working cylinder 22 is partially retracted so that the cardboard box 18 is pulled approximately half way over the fork 24.

Figure 5:
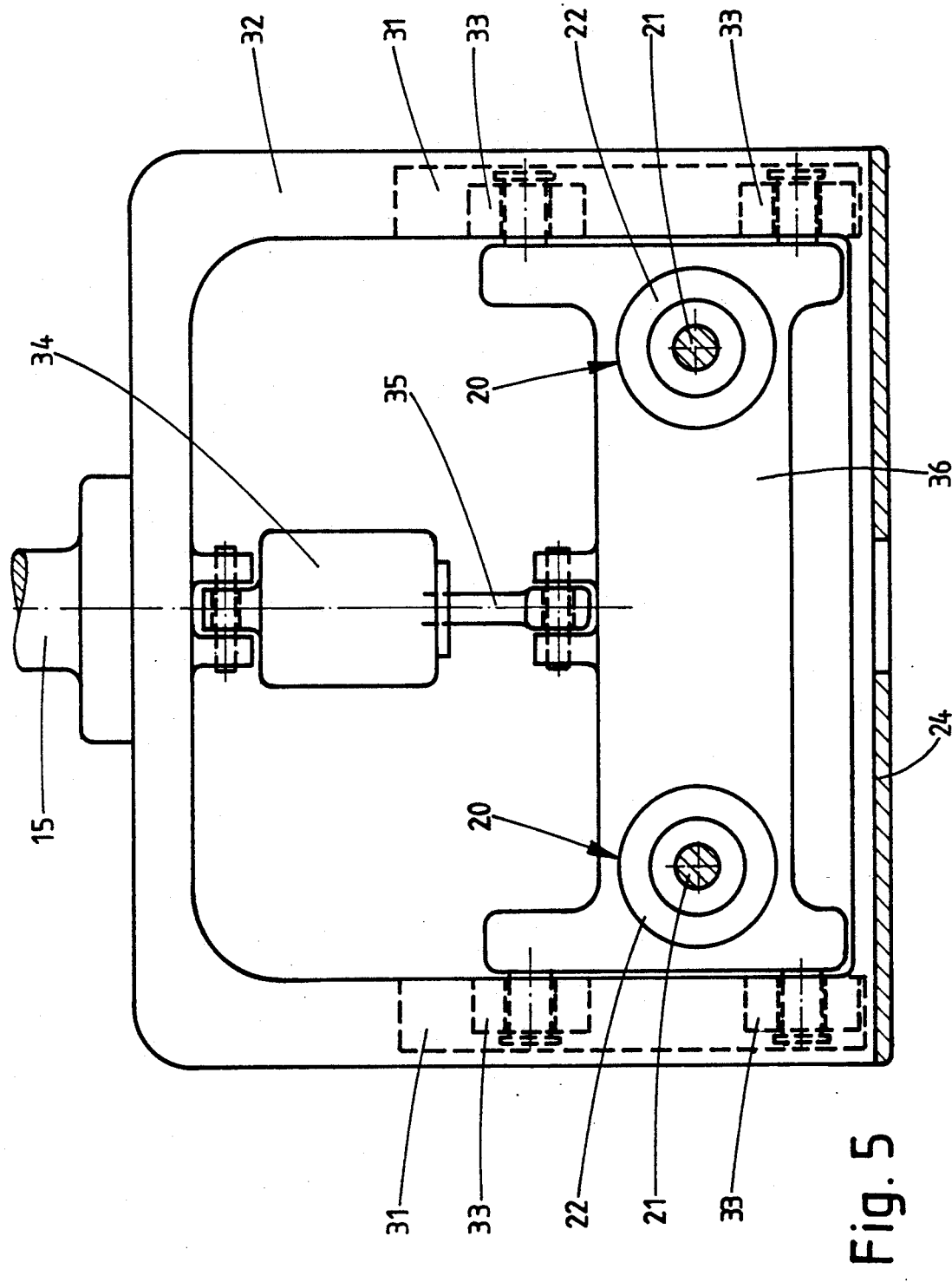

FIG. 5 shows the work head 16 according to FIG. 2 along the dot-dashed line denoted in FIG. 2 as V—V.

In this figure, the construction of the guide curves 31 and the running rollers 33 can again be recognized. On the whole, the entire arrangement of the tilting arms 20 in the basic frame 32 can be recognized. The two tilting arms 20 are connected via a transverse bar 36 to form one single tilting arm which, with regard to its swivelling, is driven by the working cylinder 34.

In FIG. 5, the application region of the head axle 15 can also be recognized which, in the exemplary embodiment, can be described better as a shaft since the basic frame 32 and thus the entire work head 16 can be turned via said shaft.

The conveying device according to the invention works as follows:

As can be seen in FIGS. 1 and 2, the work head 16 is moved up to the free sides of the cardboard boxes 18 to be removed from the pallet 17. The piston rods 21 of the piston 22 are extended until the suckers 23 contact the free sides of the cardboard boxes 18 and the suckers become fixed by suction on the sides via the connection 27. Subsequently, the piston rod 35 of the working cylinder 34 which was previously extended, is retracted and swivels the tilting arms 20 along the guide curves 31 about the bottom edges 30 of the cardboard boxes 18 to be removed. Since suction is applied to the suckers 23 on the cardboard boxes 18, by this means the cardboard boxes 18 are also tilted about their bottom edges 30 so that a wedge-shaped gap is produced between the bottom sides of the cardboard boxes 18 and the insert 25.

As shown in FIG. 4, the piston rods 21 of the working cylinders 22 are then retracted, the cardboard boxes 18 being pulled onto the fork 24. As soon as the cardboard boxes 18 are pulled beyond their centre of gravity onto the fork 24, the tilting angle of the cardboard boxes 18 is continually reduced. If the piston rods 21 are retracted, the tilting arms can again be lowered by extending the piston rod 35. The cardboard boxes 18 are now placed on the fork 24. The suction effect of the suckers 23 could be switched off, but it can also remain intact for safety reasons until the cardboard boxes have been set down on another base, for example the conveyor belt 19.

The transfer of the cardboard boxes 18 takes place by movement of the work head 16 via the conveying arm 12, in particular also by swivelling about the head axle 15.

What is claimed is:

1. A conveying device having a work head for removing vertically stacked objects from a horizontal base, said device comprising:
   tiltable organ means carried by said work head;
   support member means (24), carried by said work head, for supporting one or more of the objects which are removed from the base;
   first moving means (22) for producing relative horizontal movement between said support member means (24) and said tiltable organ means for moving an object from the base onto said support member means;
   said tiltable organ means comprising tiltable arm means (20) carrying at one end thereof suction means (23) for grasping only a free side of an object; and
   second moving means (34) for moving an opposite end of said tiltable arm means (20) in a vertically upward direction so that said tiltable arm means lifts a grasped object and simultaneously applies thereto a tilting movement;

wherein said work head (16) comprises a basic frame (32) having curved guide recesses (31) in which said opposite end of said tiltable arm means (20) is mounted for guidance and tilting during performance of said tilting movement;

wherein said tiltable arm means (20) can be extended over and beyond said support member means (24);

wherein said work head (16) is mounted on a robot (11) having an articulated conveying arm (12); and the work head (16) can be swivelled about a vertical head axle (15).

2. Conveying device according to claim 1, wherein the work head (16) is arranged at a free end of said conveying arm (12) which is articulated about three vertical axles (13 to 15) including said head axle (15).

3. A conveying device having a work head for removing vertically stacked objects from a horizontal base, said device comprising:

tiltable organ means carried by said work head;

support member means (24), carried by said work head, for supporting one or more of the objects which are removed from the base;

first moving means (22) for producing relative horizontal movement between said support member means (24) and said tiltable organ means for moving an object from the base onto said support member means;

said tiltable organ means comprising tiltable arm means (20) carrying at one end thereof suction means (23) for grasping only a free side of an object; and second moving means (34) for moving an opposite end of said tiltable arm means (20) in a vertically upward direction so that said tiltable arm means lifts a grasped object and simultaneously applies thereto a tilting movement; wherein said work head (16) comprises a basic frame (32) having curved guide recesses (31) in which said opposite end of said tiltable arm means (20) is mounted for guidance and tilting during performance of said tilting movement;

wherein said tiltable arm means (20) can be extended over and beyond said support member means (24); and wherein said opposite end of said tilting arm means (20) has guide means (33) in said curved guide recesses (31) to guide the tilting movement; and wherein said support member means extends beneath the tiltable organ means so that an object grasped at its free side by said suction means is moved onto said support member means.

4. The conveying device according to claim 3, wherein said tiltable arm means (20) comprises two tilting arms (21, 21), and wherein said suction means comprises two suction heads (23, 23) respectively carried by said two tilting arms.

5. The conveying device according to claim 3, wherein said support member means is positionable at a horizontal level which is even with a bottom surface (25) of an object to be removed.

6. The conveying device according to claim 3, wherein said support member means (24) is fork-shaped.

7. The conveying device according to claim 3, wherein said work head (16) is mounted on a robot (11) having an articulated conveying arm (12).

8. A conveying device having a work head for removing vertically stacked objects from a horizontal base, said device comprising:

tiltable organ means carried by said work head;

support member means (24), carried by said work head, for supporting one or more of the objects which are removed from the base;

first moving means (22) for producing relative horizontal movement between said support member means (24) and said tiltable organ means for moving an object from the base onto said support member means;

said tiltable organ means comprising tiltable arm means (20) carrying at one end thereof suction means (23) for grasping only a free side of an object; and to be tilted and removed from second moving means (34) for moving an opposite end of said tiltable arm means (20) in a vertically upward direction so that said tiltable arm means lifts a grasped object and simultaneously applies thereto a tilting movement;

wherein said work head (16) comprises a basic frame (32) having curved guide recesses (31) in which said opposite end of said tiltable arm means (20) is mounted for guidance and tilting during performance of said tilting movement;

wherein said tiltable arm means (20) can be extended over and beyond said support member means (24); and wherein said guide recesses (31) are in the shape of an arc, and wherein, when said work head is positioned so that said suction means has just grasped the free side of the object, said arc has a radius centered on an object's bottom edge (30) of a side opposite to said free side which is grasped by said suction means.

9. The conveying device according to claim 8, wherein said first moving means moves said tiltable arm means (20) back and forth in a horizontal direction.

10. The conveying device according to claim 8, wherein said support member means (24) is displaceable by said first moving means (22) back and forth under a tilted object (18).

11. The device according to claim 8, wherein said support member means (24) is vertically transportable with said tiltable organ means (20).

12. A conveying device having a work head for removing vertically stacked objects from a horizontal base, said device comprising:

tiltable organ means carried by said work head;

support member means (24), carried by said work head, for supporting one or more of the objects which are removed from the base;

first moving means (22) for producing relative horizontal movement between said support member means (24) and said tiltable organ means for moving an object from the base onto said support member means;

said tiltable organ means comprising tiltable arm means (20) carrying at one end thereof suction means (23) for grasping only a free side of an object; and second moving means (34) for moving an opposite end of said tiltable arm means (20) in a vertically upward direction so that said tiltable arm means lifts a grasped object and simultaneously applies thereto a tilting movement;

wherein said work head (16) comprises a basic frame (32) having curved guide recesses (31) in which said opposite end of said tiltable arm means (20) is mounted for guidance and tilting during performance of said tilting movement;

wherein said tiltable arm means (20) can be extended over and beyond said support member means (24); and wherein said tiltable arm means (20) has running rollers (33, 33) which run in said guide recesses (31) to enable tilting of said tiltable arm means.

13. The conveying device according to claim 12, wherein said work head (16) is mounted on a robot (11) having an articulated conveying arm (12).

* * * * *